United States Patent
Osaki

(10) Patent No.: US 12,086,664 B2
(45) Date of Patent: Sep. 10, 2024

(54) PRINTING DEVICE EXECUTING PRINTER JOB LANGUAGE COMMAND ON SPECIFIC CONDITION

(71) Applicant: BROTHER KOGYO KABUSHIKI KAISHA, Nagoya (JP)

(72) Inventor: Masayoshi Osaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/465,282

(22) Filed: Sep. 12, 2023

(65) Prior Publication Data
US 2024/0111977 A1    Apr. 4, 2024

(30) Foreign Application Priority Data
Sep. 29, 2022 (JP) ................... 2022-155768

(51) Int. Cl.
*G06K 15/02*    (2006.01)
*G06F 3/12*    (2006.01)

(52) U.S. Cl.
CPC ....... *G06K 15/1805* (2013.01); *G06F 3/1205* (2013.01); *G06F 3/1238* (2013.01); *G06K 15/1809* (2013.01)

(58) Field of Classification Search
None
See application file for complete search history.

(56) References Cited

U.S. PATENT DOCUMENTS

2016/0295057 A1 * 10/2016 Miyake ............ H04N 1/32502

FOREIGN PATENT DOCUMENTS

| JP | 2005305666 A | * | 11/2005 | |
|---|---|---|---|---|
| JP | 2014179018 A | | 9/2014 | |
| WO | WO-2022045101 A1 | * | 3/2022 | ............ G03G 15/80 |
| WO | WO-2022045102 A1 | * | 3/2022 | |

OTHER PUBLICATIONS

English translation of JP-200530566-A. (Year: 2005).*
English translation of WO-2022045101-A1. (Year: 2022).*
English translation of WO-2022045102-A1. (Year: 2022).*

* cited by examiner

*Primary Examiner* — Thomas D Lee
(74) *Attorney, Agent, or Firm* — Scully, Scott, Murphy & Presser, PC

(57) ABSTRACT

In a printing device, on a first condition including that a printer job language (PJL) command is received via the first communication interface that is a LAN interface, a computer performs prohibiting execution of the PJL command when the PJL command is classified into a first command type, and executing the PJL command when the PJL command is classified into a second command type different from the first command type. On a second condition including that the PJL command is received via the second communication interface different from the LAN interface, the computer performs executing the PJL command regardless of whether the PJL command is classified into the first command type or the second command type.

17 Claims, 8 Drawing Sheets

FIG. 7

| COMMAND NAME | PROCESS CONTENT |
|---|---|
| DEFAULT | The DEFAULT command sets the User Default Environment values and stores these values in the nonvolatile RAM. |
| INITIALIZE | The INITIALIZE command resets the PJL Current Environment variables and the User Default Environment variables to their Factory Default values. |
| RESET | The RESET command resets the PJL Current Environment variables to their User Default values. |
| SET | The SET command changes PJL Current Environment variables to the specified values until a next PJL reset condition defaults the value. |
| RDYMSG | The RDYMSG command replaces the control panel's "ready" message with the specified message. |
| OPMSG | The OPMSG command prompts the printer to display the specified message on the control panel of the printer and go offline. |
| STMSG | The STMSG command prompts the printer to display the specified message on the control panel of the printer, go offline, and return a status message indicating which key the operator pressed to return the printer online. |

FIG. 8

| VARIABLE | DESCRIPTION |
| --- | --- |
| CPLOCK | The CPLOCK is for setting the control panel lockout state. |
| DISKLOCK | The DISKLOCK is for setting the default disk lockout state. |
| HOLD | The HOLD is for specifying whether a job is printed immediately or stored. |
| LANG | The LANG is for setting the default display language for the control panel. |
| POWERSAVE | The POWERSAVE is for enabling or disabling power-saving feature. |
| TIMEOUT | The TIMEOUT is for setting duration of timeouts for receiving data via an I/O port. |

PRINTING DEVICE EXECUTING PRINTER JOB LANGUAGE COMMAND ON SPECIFIC CONDITION

REFERENCE TO RELATED APPLICATIONS

This application claims priority from Japanese Patent Application No. 2022-155768 filed on Sep. 29, 2022. The entire content of the priority application is incorporated herein by reference.

BACKGROUND ART

Printing devices capable of executing processes according to Printer Job Language (PJL) commands are known in the art.

DESCRIPTION

The object of this disclosure is to improve the security of printing devices capable of executing processes according to PJL commands.

In order to attain the above and other objects, according to one aspect, the present disclosure provides a printing device. The printing device includes a first communication interface, a second communication interface, and a computer. The computer is configured to perform: on a first condition including that a printer job language (PJL) command is received via the first communication interface that is a LAN interface, prohibiting execution of the PJL command when the PJL command is classified into a first command type; and executing the PJL command when the PJL command is classified into a second command type different from the first command type; and on a second condition including that the PJL command is received via the second communication interface different from the LAN interface, executing the PJL command regardless of whether the PJL command is classified into the first command type or the second command type.

According to another aspect, the present disclosure provides a printing device. The printing device includes a first communication interface. a computer. The computer is configured to perform: on a first condition including that a printer job language (PJL) command is received via the first communication interface that is a LAN interface according to a first protocol, executing the PJL command regardless of whether the PJL command is classified into a first command type or a second command type different from the first command type; on a second condition including that the PJL command is received via the first communication interface that is the LAN interface according to a second protocol different from the first protocol, prohibiting execution of the PJL command when the PJL command is classified into the first command type; and executing the PJL command when the PJL command is classified into the second command type.

In the above structure, restriction of execution of the PJL command is varied on the basis of the path through which the PJL command is transmitted. Accordingly, security of the printing device, which can execute the PJL command, can be improved.

FIG. 7 is a table illustrating commands subject to execution restriction and contents of the processes according to the commands.

FIG. 8 is a table illustrating names of environment variables and descriptions of the variables.

The embodiment of the present disclosure will be described while referring to the accompanied drawings. The embodiment is just an example and may be modified without departing from the scope of the invention. The order of processes or steps described later may be modified without departing from the scope of the invention.

Figure 1:
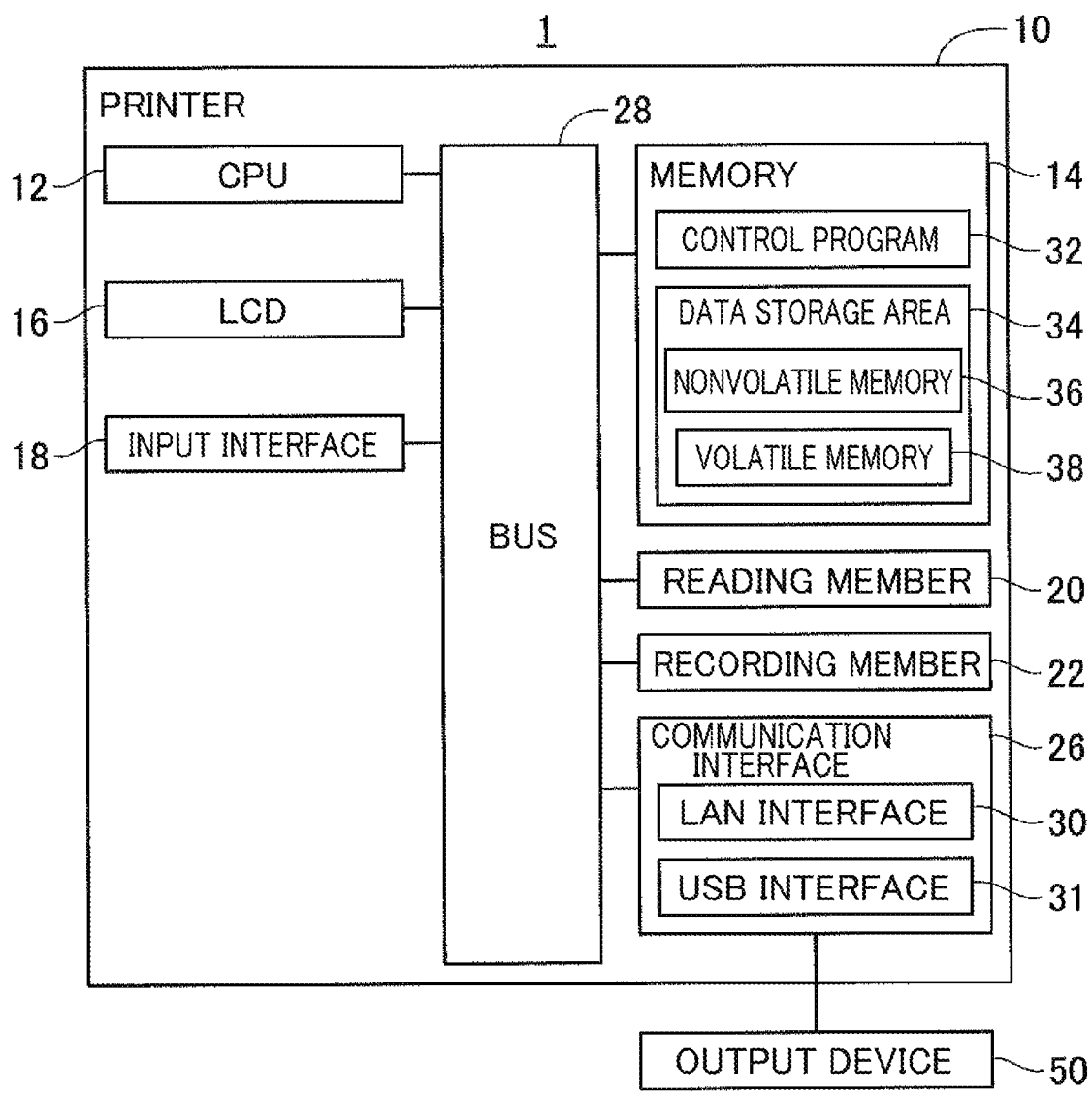
FIG. 1 is a block diagram illustrating a communication system.

FIG. 1 is a block diagram showing a communication system 1 according to the present embodiment. The communication system 1 shown in FIG. 1 is provided with a printer 10 (an example of the printing device and the data reception device), and an output device 50 (an example of the data output device). The printer 10 is a device that can execute printing processes and other various processes. The printer 10 can execute various processes according to PJL commands outputted from the output device 50. The output device 50 may be any of various devices capable of outputting PJL commands, such as a PC, a mobile terminal, or a USB device.

The printer 10 is primarily provided with a Central Processing Unit (CPU) 12 as an example of the computer, a memory 14, a Liquid Crystal Display (LCD) 16, an input interface 18, a reading member 20, a recording member 22, and a communication interface 26. These components are capable of communicating with each other via a bus 28.

The printer 10 can communicate with the output device 50 via the communication interface 26. The communication interface 26 is provided with a local area network (LAN) interface 30 (an example of the first communication interface and the LAN interface), and a Universal Serial Bus (USB) interface 31 (an example of the second communication interface). The LAN interface 30 is used for communication via a local area network (LAN) and a wide area network (WAN). The USB interface 31 is used for inputting data from and outputting data to devices (USB devices) according to the USB standard. The USB interface 31 is provided with a connector for connecting a USB cable, and a connector for connecting a USB device such as USB memory.

The CPU 12 executes processes in accordance with a control program 32 stored in the memory 14. The memory 14 is also provided with a data storage area 34. The data storage area 34 stores data required for executing the control program 32 and the like. The memory 14 includes a non-volatile memory 36, such as ROM or flash memory, and a volatile memory 38, such as RAM.

The memory 14 may include any storage medium that can be read by a computer. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The LCD 16 displays various information on the printer 10. The display in this disclosure is not limited to a liquid crystal display but may be a display configured of another system such as an organic light-emitting diode (OLED) display. The input interface 18 is a touchscreen integrally configured with the display, for example. The input interface 18 receives user operations through icons, buttons, and the like displayed on the display. In addition to the touchscreen, the input interface 18 may include hard keys and the like.

The reading member 20 is provided with an image sensor. The reading member 20 executes scanning operations to read images with the image sensor. The recording member 22 is an electrophotographic printing mechanism, for example. Alternatively, the recording member 22 may be an inkjet printing mechanism. The recording member 22 may be a print engine and include a print head to form an image on a sheet.

In the following description, actions such as "determine," "extract," "select," "calculate," "decide," "identify," "acquire," "receive," "control," "set," and the like represent processes performed by the CPU 12. Processes performed by the CPU 12 include processes that control hardware through APIs provided in the OS. Hereinafter, the expressions such as "using the OS" are omitted when operations of programs are described. For example, the phrase "the program B controls the hardware C" may signify that the program B controls the hardware C using an API provided in the OS. A process executed by the CPU 12 according to instructions described in a program may be described using abbreviated expressions, such as "the CPU 12 executes," and "the program B executes."

Note that the term "acquire" in this specification is used as a concept that does not necessarily require a request. In other words, a process by which the CPU 12 receives data without requesting that data is included in the concept of "the CPU 12 acquires data." The term "data" described herein is expressed as bit strings that can be read by a computer. Data of different formats are treated as the same data when the content of the data is essentially the same. The same holds true for "information" in this specification. An "instruction," a "request," or the like is processed by communicating information indicating the "instruction," or the "request." The terms "instruction" and "request" may also be used to describe information indicating an "instruction" or a "request."

Further, a process performed by the CPU 12 to determine whether information A indicates circumstance B may be described conceptually as "determining whether circumstance B based on information A." A process in which the CPU 12 determines whether information A indicates circumstance B or circumstance C may be described conceptually as "determining whether circumstance B or circumstance C based on information A."

When the printer 10 receives a PJL file outputted from the output device 50, the CPU 12 of the printer 10 executes the control program 32 to perform a process in accordance with the PJL file. Here, processes executed on the printer 10 will be described in detail with reference to the sequence charts in FIGS. 2 through 4 and the flowchart in FIG. 5. The PJL file includes one or more PJL commands.

The printer 10 may receive PJL files outputted from the output device 50 via the LAN interface 30 or the USB interface 31 of the communication interface 26. When receiving PJL files via the LAN interface 30, the printer 10 may accept PJL files according to the Hyper Text Transfer Protocol Secure (HTTPS) (an example of the first protocol) protocol or may accept PJL files according to specific communication protocols (examples of the second protocol). Here, the specific communication protocol is a protocol that does not require a process to authenticate a transmission device and permit the transmission device to transmit data under a condition that the authentication of the transmission device is successful. Because the HTTPS protocol requires authentication of the transmission device, the specific communication protocol is different from the HTTPS protocol. For example, the specific communication protocol is Hyper Text Transfer Protocol (HTTP), File Transfer Protocol (FTP), or Line Printer Daemon Protocol (LPR). Another example of the specific communication protocol is a protocol used by the Standard TCP/IP port monitor provided by Windows (U.S. trademark of Microsoft Corporation). Hereinafter, the protocol used by the Standard TCP/IP port monitor is simply referred to as "Standard TCP/IP port monitor" or "Standard TCP/IP port". The Standard TCP/IP port monitor is a protocol that uses, as a default port, port 9100 of TCP/IP to communicate according to the RAW protocol. The Standard TCP/IP port monitor may use port 515 to communicate according to the LPR protocol. The specific communication protocol that uses port 9100 may be abbreviated as "PORT 9100" protocol.

First, a process in which the printer 10 receives a PJL file according to a specific communication protocol other than HTTPS will be described by referring to FIG. 2. Many clients that transmit PJL files to printers 10 use the Standard TCP/IP port monitor as the specific communication protocol. Specifically, Windows provides the Standard TCP/IP port monitor that uses, as a default port, port 9100 for communicating with printers. In S100 shown in FIG. 2, the output device 50 outputs a PJL file, specifying 9100 (or 515) as the receiving port number. As a result, in S102 the printer 10 receives the PJL file via the LAN interface 30 according to a specific communication protocol. The PJL file includes one or more PJL commands. Thus, when the printer 10 receives a PJL file, in S104 the printer 10 executes a PJL reception process. The PJL reception process is executed by the control program 32. This process will be described later with reference to FIG. 5. Unlike HTTPS, which will be described later, the specific protocols such as the Port 9100 protocol do not specify an authentication procedure. Accordingly, the sequence chart shown in FIG. 2 does not include an authentication procedure. In S106 the printer 10 returns the results of the processes executed in S104 to the output device 50 as a response. The details of S106 will be described later.

Next, a process in which the printer 10 receives a PJL file according to HTTPS will be described by referring to FIG. 3. Here, the applicant has conceived to develop a client software that can transmit the PJL commands to the printer 10 using HTTPS. When the user uses such a client software so as to send the PJL commands to the printer 10, the PJL command can be transmitted while a high level security can be ensured. The HTTPS protocol also defines an authentication procedure. In S110 shown in FIG. 3, the output device 50 transmits an authentication request to the printer 10 according to the procedure defined in HTTPS, while specifying 443 as the receiving port number. Accordingly, in S112 the printer 10 receives the authentication request via the LAN interface 30 according to HTTPS. The authentication request includes a password.

After receiving the authentication request, in S114 the printer 10 authenticates the output device 50 with the password included in the authentication request. In other words, an authentication password has been set on the printer 10 in advance, and the printer 10 confirms whether the password included in the authentication request matches the authentication password set on the printer 10. When the password in the authentication request matches the authentication password preset on the printer 10, in S116 the printer 10 returns an authentication successful response to the output device 50. After receiving the authentication successful response, in S118 the output device 50 transmits a PJL file to the printer 10 according to HTTPS, while specifying 443 as the receiving port number. Accordingly, in S120 the printer 10 receives the PJL file via the LAN interface 30 according to HTTPS. After receiving a PJL file in this way, the printer 10 executes the PJL reception process in S104. In S106 the printer 10 returns the results of the processes executed in S104 to the output device 50 as a response. The details of S106 will be described later.

Next, a process in which the printer 10 receives a PJL file via the USB interface 31 will be described. The output device 50 outputting the PJL file is a USB device, such as USB memory. Thus, when the USB memory or other USB device is connected to the printer 10, in S130 of FIG. 4 the output device 50 outputs the PJL file to the printer 10. In S132 the printer 10 receives the PJL file via the USB interface 31. When receiving a PJL file in this way, the printer 10 executes the PJL reception process in S104. In S106 the printer 10 returns the results of the processes executed in S104 to the output device 50 as a response. The details of S106 will be described later.

Next, the PJL reception process of S104 will be described in greater detail with reference to FIG. 5. In S200 of FIG. 5, the control program 32 identifies one or more PJL commands included in the received PJL file. In S202 the control program 32 references settings stored in the memory 14 to determine whether a PJL security setting has been enabled. The PJL security setting sets whether security measures are to be taken for processes using PJL commands.

Figure 2:
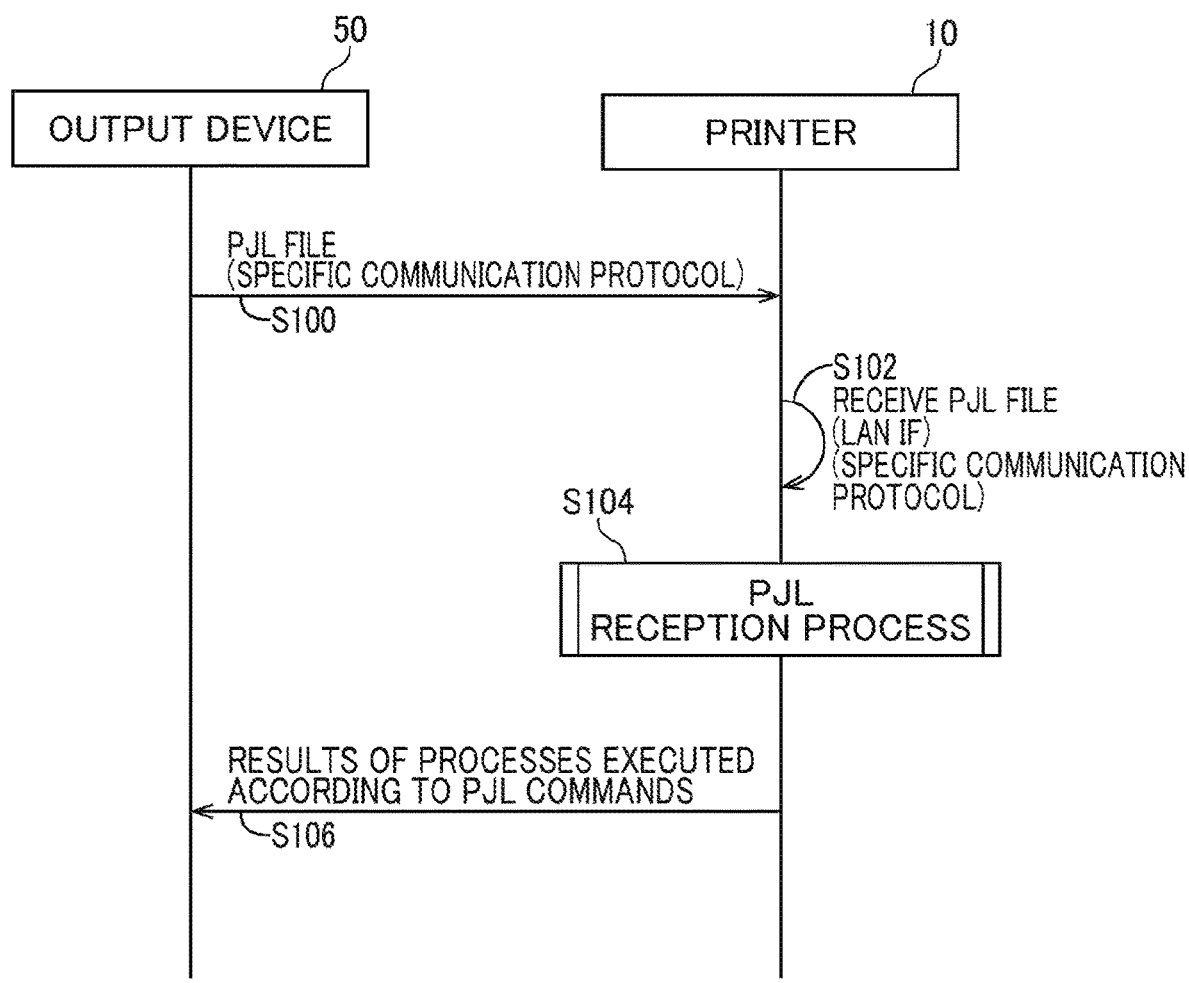
FIG. 2 is a sequence diagram illustrating a process executed by an output device and a printer.
Figure 3:
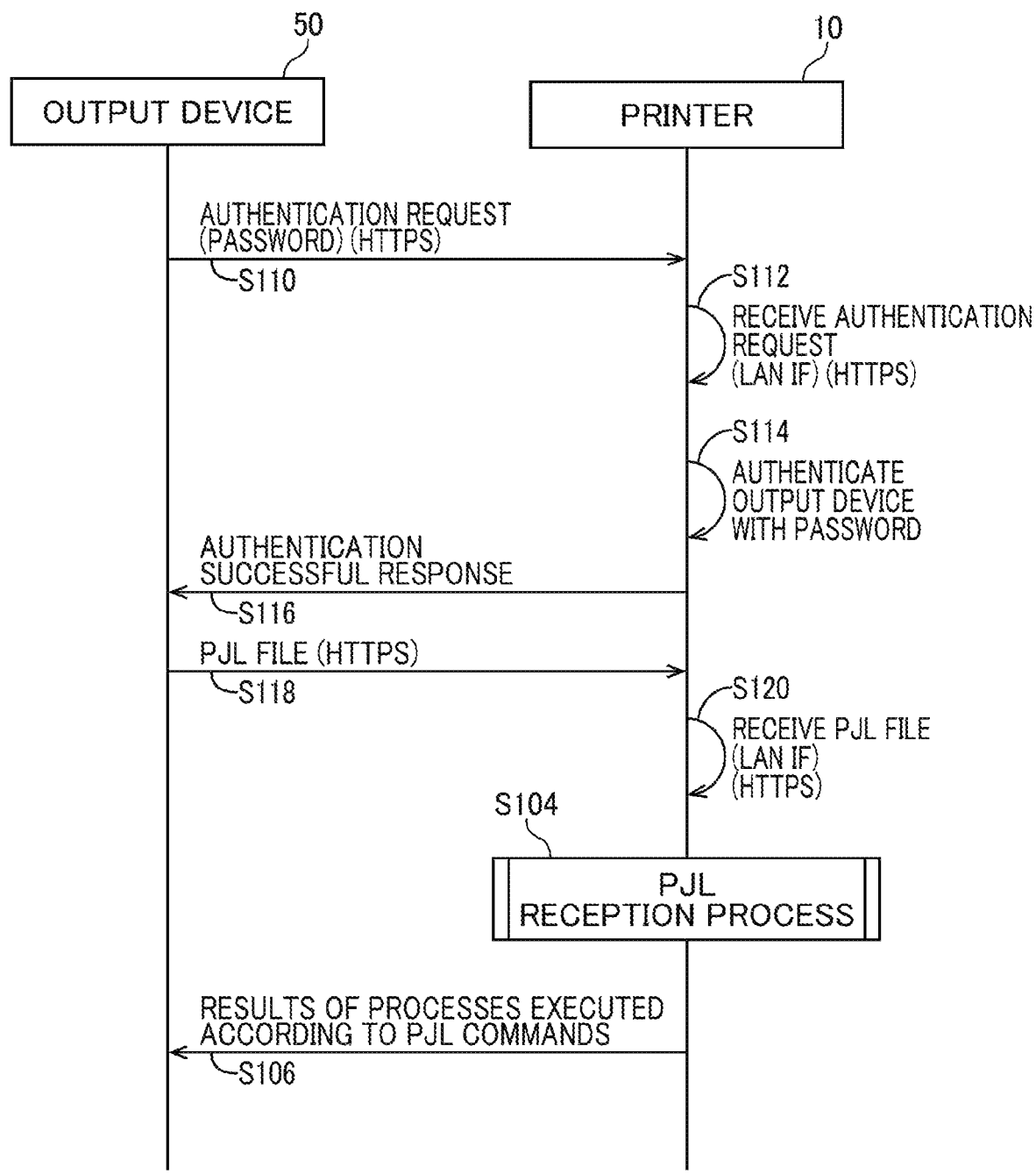
FIG. 3 is a sequence diagram illustrating a process executed by the output device and the printer.
Figure 4:
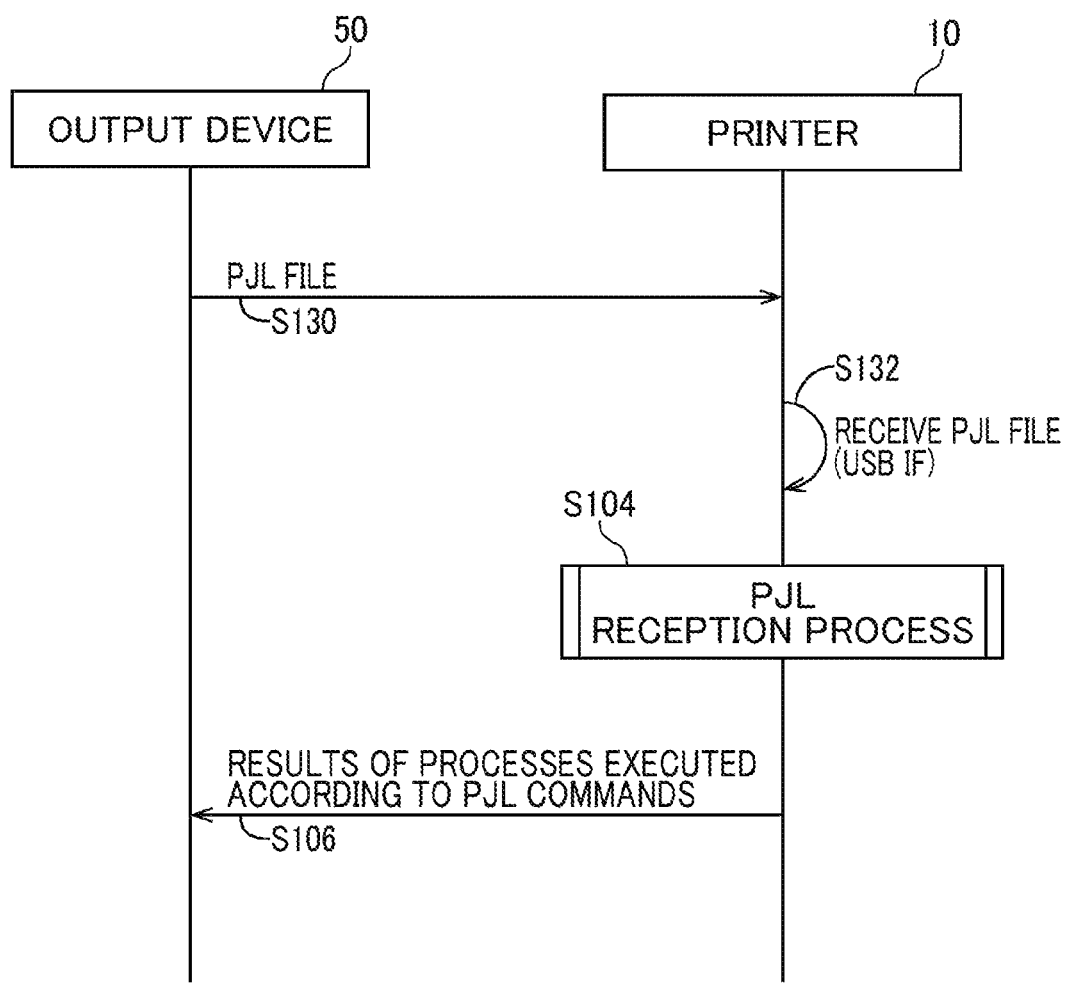
FIG. 4 is a sequence diagram illustrating a process executed by the output device and the printer.
Figure 6:
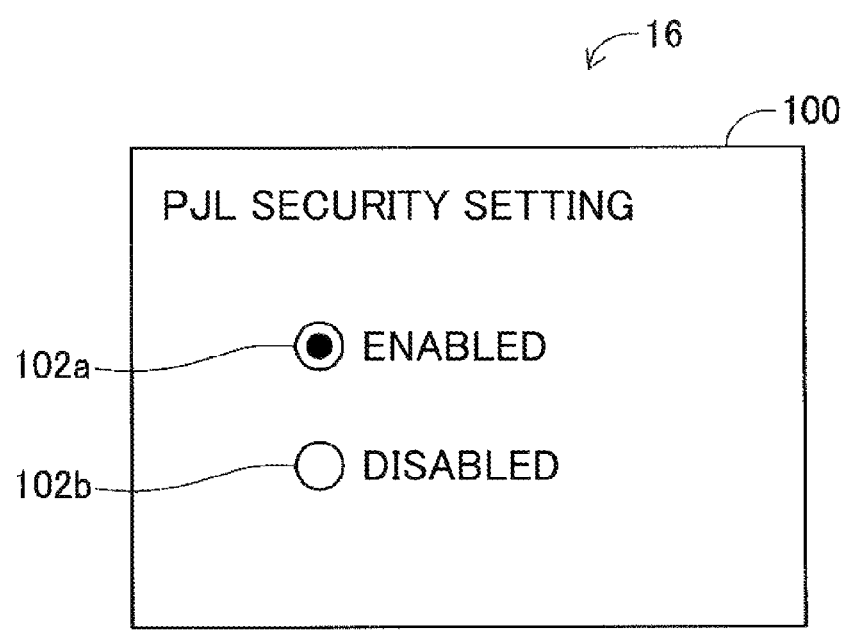
FIG. 6 is an explanatory diagram illustrating a settings screen.

The PJL security setting is set in a settings screen 100 shown in FIG. 6 at a different timing from the timing at which the process in FIGS. 2 through 4 is executed. The control program 32 displays the settings screen 100 on the LCD 16 in response to operations performed via the input interface 18, for example. The settings screen 100 includes a radio button 102a specifying "enabled" and a radio button 102b specifying "disabled." When the radio button 102a is selected in the settings screen 100 through an operation on the input interface 18, the control program 32 stores a setting value in the memory 14 indicating that the PJL security setting has been enabled. When the radio button 102b was selected, the control program 32 stores a setting value in the memory 14 indicating that the PJL security setting has been disabled. Note that the PJL security setting is set to "enabled" by default when the printer 10 is shipped from the factory.

When the PJL security setting is set to "disabled" (S202: NO), in S208 the control program 32 performs a process according to each PJL command identified in S200 and subsequently ends the PJL reception process. When the PJL security setting is set to "enabled" (S202: YES), in S204 the control program 32 determines whether the printer 10 received the PJL file via the USB interface 31.

When the printer 10 received the PJL file according to a communication protocol other than HTTPS, as shown in FIG. 2, the control program 32 determines that the printer 10 did not receive the PJL file via the USB interface 31 (S204: NO). Further, when the printer 10 received the PJL file according to a communication protocol HTTPS, as shown in FIG. 3, the control program 32 also determines that the printer 10 did not receive the PJL file via the USB interface 31 (S204: NO). In these cases, in S206 the control program 32 determines whether the printer 10 received the PJL file via the LAN interface 30 according to HTTPS. As described above, when a PJL file is transmitted to the printer 10 by HTTPS, the transmitted file specifies 443 as the receiving port number. Therefore, the control program 32 determines that the PJL file was received by HTTPS when the PJL file was received through a communication in which 443 was specified as the receiving port number and determines that the PJL file was received by a communication protocol other than HTTPS when the PJL file was received through a communication in which the port number other than the number 9100 was specified as the receiving port number, for example.

When the PJL file is transmitted, the PJL file may be included in a network packet defined by the communication protocol. Specifically, the network packet includes the PJL file as a payload and information other than the payload. In such cases, the information other than the payload includes information on the used communication protocol for transmitting the PJL file. The control program 32 may determines the communication protocol used for transmitting the PJL file on the basis of the information other than the payload in the network packet.

When the PJL file was received by a specific communication protocol other than HTTPS (S206: NO), in S210 the printer 10 reads command information from a table specifying PJL commands that are subject to execution restriction. The table shown in FIG. 7 is stored in the nonvolatile memory 36 of the printer 10. This table stores information specifying PJL commands subject to execution restriction, i.e., information on commands whose execution is restricted. The control program 32 reads this command information from the table. In this example, PJL commands set as commands subject to execution restriction (hereinafter referred to as "restricted commands") are "DEFAULT," "INITIALIZE," "RESET," "SET," "RDYMSG," "OPMSG," and "STMSG." The PJL commands subject to execution restriction are examples of the first type PJL command. Since process content of these restricted commands is provided in FIG. 7, a detailed description of these processes has been omitted herein, but the following is a brief description. "DEFAULT" and "SET" are commands instructing a change in settings stored in the nonvolatile memory 36. "INITIALIZE" and "RESET" are commands instructing the initialization of settings stored in the nonvolatile memory 36. "OPMSG" and "STMSG" are commands instructing the printer 10 to be taken offline. "RDYMSG" is a command instructing a change in a message displayed on the LCD 16.

In other words, the table shown in FIG. 7 is used for classifying a PJL command into one of a first command type subject to execution restriction and a second command type not subject to execution restriction. Each PJL command matching one of the PJL commands described in the table is classified into the first command type and each PJL command not matching any of the PJL commands in the table is classified into the second command type. Put differently, the table defines the first command type by describing the PJL commands subject to execution restriction as members of the first command type.

For convenience, the table shown in FIG. 7 describes the command names and process content of restricted commands, but the process content of restricted commands is not provided in the table stored in the nonvolatile memory 36. As described above, "DEFAULT" and "SET" are commands instructing a change in setting values stored in the nonvolatile memory 36, and the PJL commands for "DEFAULT" and "SET" include a "variable" and "value." The form of the JPL command is as follows.

@Pjl Default/Set "Variable"="Value"

Here, "variable" is set to a name specifying an environment variable in the commands for "DEFAULT" and "SET". The variables shown in FIG. 8 are examples of variables that may be included in the PJL commands "DEFAULT" and "SET." Accordingly, the "DEFAULT" and "SET" PJL commands instruct the setting corresponding to the variable included in the command to be set to the value included in the command. FIG. 8 also includes a description of the settings for the corresponding variables.

In S212 the control program 32 determines whether any of the PJL commands identified in S200 are restricted commands. There are cases in which the PJL file includes a plurality of PJL commands. In such cases, when the PJL file includes at least one PJL command classified into the first command type, the control program 32 may make YES determination in S212 whereas when the PJL file includes no PJL command classified into the first command type, i.e. all the PJL commands included in the PJL file are classified into the second command type, the control program 32 may make NO determination in S212.

When NO determination is made in S212 (S212: NO), in S208 the control program 32 performs processes according to the PJL commands identified in S200 and subsequently ends the PJL reception process. However, when YES determination is made in S212 (S212: YES), the control program 32 ends the PJL reception process without executing processes according to the PJL commands identified in S200.

There may be cases in which the PJL file includes a plurality of groups of PJL commands and each group of PJL commands can be executed independently from the remaining groups of PJL commands. In such cases, after the process of S210, the control program 32 may execute each group in which all the PJL commands are classified into the second command type, but may not execute each group in which at least one PJL command is classified into the second command type.

PJL commands also include commands for instructing the printing of images (hereinafter called "print instruction commands"). Print instruction commands are outputted together with image data for the image targeted by the print instruction. In this case, the print instruction commands and the image data are both included in a print job, and the print job included in the PJL file is outputted. Alternatively, the print commands may be data separate from the print job including the image data, and the print job and the print commands may be separately included in the PJL file. Anyway, there are cases that the PJL file includes both print instruction commands and image data. The print instruction commands include information indicating that the print data includes image data, information specifying the job name of the print data, information specifying the username of the print data, information specifying printing parameters to be used when printing the print data, and a command indicating that the print data is to be printed according to a special method. The special method may be a method of storing the print data in the memory 14 rather than printing the data immediately and then printing the print data in response to an instruction received through an operation on the input interface 18.

The print instruction commands also include information specifying where the image data starts in the print data, and information specifying the format of the image data. Examples of image data formats are Printer Command Language (PCL), PostScript (PS; PostScript is a registered trademark of Adobe inc.), Portable Document Format (PDF), Joint Photographic Experts Group (JPEG), and raw. As shown in FIG. 7, commands subject to restrictions include "DEFAULT," "INITIALIZE," "RESET," "SET," "RDYMSG," "OPMSG," and "STMSG." The restricted commands do not include any print instruction commands. In other words, PJL commands sent together with image data are not included in the restricted commands. Accordingly, when PJL commands are transmitted together with image data, processes according to those PJL commands are executed regardless the output path for the PJL commands (or the PJL file), and a printing process is executed to print an image based on the image data.

Figure 5:
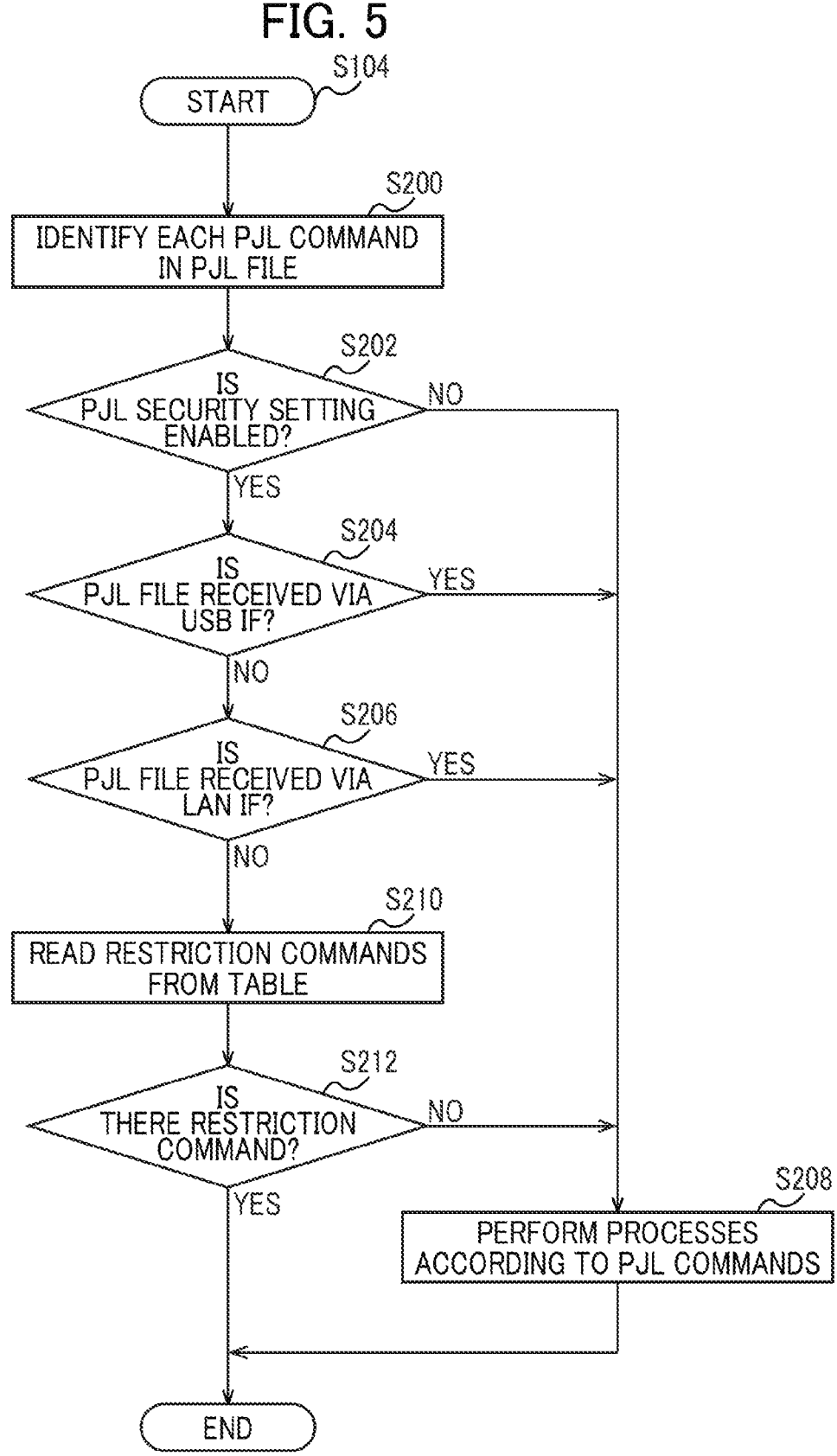
FIG. 5 is a flowchart illustrating a process executed according to a control program.

In the PJL reception process shown in FIG. 3 for cases in which the printer 10 received a PJL file by HTTPS, when the control program 32 determines in S202 of FIG. 5 that the PJL security setting has been enabled (S202: YES), in S206 the control program 32 will determine that the printer 10 received the PJL file via the LAN interface 30 by HTTPS (S206: YES). Thus, in S208 the control program 32 executes processes according to the PJL commands identified in S200 and subsequently ends the PJL reception process.

In the PJL reception process shown in FIG. 4 for cases in which the printer 10 received a PJL file via the USB interface 31, when the control program 32 determines in S202 that the PJL security setting has been enabled (S202: YES), in S204 the control program 32 will determine that the printer 10 received the PJL file via the USB interface 31 (S204: YES). Thus, in S208 the control program 32 executes processes according to the PJL commands identified in S200 and subsequently ends the PJL reception process.

After completing the PJL reception process, in S106 of the respective processes shown in FIGS. 2 through 4, the control program 32 returns the results of the processes executed by the printer 10 in S208 to the output device 50 as a response. The response in S106 is sent only when a response is required for the processes executed in S208. In other words, when a response is not required for the processes executed in S208, the control program 32 skips the process of S106. Further, when the printer 10 receives a PJL file according to a specific communication protocol and YES determination is made in S212 (S212: YES in FIG. 5), the control program 32 does not execute processes according to the PJL commands. Therefore, the process of S106 is not executed when execution of the PJL command is restricted.

The embodiment described above obtains the following effects.

When the printer 10 receives a PJL file through a specific communication protocol, the printer 10 does not execute processes according to the PJL commands in the received file when one of the PJL commands is a restricted command whereas the printer 10 executes the processes according to the PJL commands when none of the PJL commands is a restricted command. Here, the commands other than the restricted command are examples of the second type command. When the printer 10 receives a PJL file through HTTPS, the printer 10 executes the processes according to the PJL commands, regardless of whether the commands included in the received PJL file are subject to restriction. This method can improve the security of the printer 10 for executing processes according to PJL commands.

As described above, HTTPS is a communication protocol that includes an authentication procedure when transmitting a PJL file to the printer 10. In other words, the administrator of the communication system 1, the administrator of the printer 10, or the user of the printer 10 (hereinafter referred to as "the administrator or the like") can set a password for the printer 10 to prevent a malicious user from transmitting a PJL file to the printer 10 by HTTPS. Therefore, when the printer 10 receives a PJL file by HTTPS, the printer 10 executes processes according to the PJL commands included in the received file, regardless of whether the PJL commands are restricted commands. Since specific communication protocols, which are different from HTTPS, do not include an authentication procedure, it is difficult to prevent malicious users from transmitting PJL files to the printer 10 according to a specific communication protocol. When a malicious user were to transmit a restricted command to the printer 10 and the printer 10 were to execute the process according to the restricted command, the settings for the printer 10 could be modified or initialized or the printer 10 could be taken offline, though this action is not the intention of the administrator or the like.

In light of this fact, the printer 10 does not execute any processes according to the PJL commands included in the received PJL file when the printer 10 of the present embodiment receives a PJL file according to a specific communication protocol and the received PJL file includes a command subject to restriction. When none of the PJL commands included in the received PJL file are subject to restriction, the printer 10 executes the processes according to the PJL commands. On the other hand, the administrator or the like can instruct the printer 10 through PJL commands according to a specific communication protocol, as long as the PJL commands are not subject to restriction. This method not only ensures the user's convenience in being able to instruct the printer 10 with PJL files transmitted according to a specific communication protocol but also improves security for the printer 10 by preventing settings in the printer 10 from being modified or initialized or the printer 10 from being taken offline as a result of PJL files transmitted according to a specific communication protocol.

As described above, the printer 10 does not execute the process of S106 when determining that the PJL file includes a PJL command subject to restriction (S212: YES in FIG. 5). In other words, when the output device 50 transmits a restricted command to the printer 10 by a specific communication protocol, the printer 10 does not transmit a response to the output device 50, thereby eliminating the possibility of information being supplied to malicious users, for example. That is, if the printer 10 were to return error information or the like to the output device 50 in response to the output device 50 transmitting a restricted command according to a specific communication protocol, for example, a user could analyze the information transmitted to the output device 50 to obtain information on the printer 10. Hence, by not replying to the output device 50 in response to a restricted command, the printer 10 can eliminate the possibility of providing information to a malicious user.

When the printer 10 receives a PJL file via the USB interface 31, the printer 10 executes processes according to the PJL commands included in the received PJL file regardless of whether the commands are restricted. In this case, the output device 50 outputting the PJL file to the printer 10 via the USB interface 31 is a USB device such as USB memory. When USB memory or another USB device containing a PJL file is connected to the printer 10, the printer 10 receives the PJL file via the USB interface 31. In other words, a user who can connect a USB device such as USB memory to the printer 10 must be close to the printer 10 and, consequently, only certain users can connect a USB device to the printer 10. Therefore, since it is unlikely that a malicious user can output a PJL file to the printer 10 via the USB interface 31, the printer 10 executes processes according to PJL commands included in PJL files received via the USB interface 31, regardless of whether the PJL commands are restricted.

Note that the printer 10 may also receive PJL files from a client (an output device 50) through a USB cable connected to the USB interface 31 rather than a USB device such as USB memory. Since a USB cable can only be used when the client is placed near the printer 10, a user who can connect the client to the printer 10 must be in proximity to the printer 10, just as with the USB memory. In view of this, it is unlikely that a malicious user would use a USB cable to send a PJL file. Hence, when a PJL file is received via a USB cable connected to the USB interface 31, the printer 10 executes the processes according to the PJL commands included in the received PJL files, regardless of whether the commands are restricted.

When the PJL security setting is disabled, the printer 10 executes processes according to PJL commands, regardless of whether the PJL commands are restricted. For example, in environments or other situations in which the threat of malicious users is low, the administrator or the like can intentionally configure the printer 10 to execute processes according to PJL commands, regardless of whether the commands are restricted.

While the disclosure has been described in detail with reference to specific embodiments thereof, it would be apparent to those skilled in the art that many modifications and variations may be made therein without departing from the spirit of the invention, the scope of which is defined by the attached claims. For example, the commands subject to restriction in the above embodiment are "DEFAULT," "INITIALIZE," "RESET," "SET," "RDYMSG," "OPMSG," and "STMSG," but any other PJL commands may be set as restricted commands.

In the embodiment described above, certain PJL commands are set as restricted commands, and processes according to PJL commands are only executed when the PJL commands are not restricted commands. As an alternative, certain PJL commands may be set as commands whose processes are not restricted (hereinafter called "non-restricted commands"). For example, a table stored in the nonvolatile memory 36 may define non-restricted commands that are classified into the second command type. In this case, processes according to PJL commands are executed when the commands are non-restricted commands and are not executed when the commands are PJL commands other than the non-restricted commands. For example, when a PJL file includes PJL commands each matching one of the non-restricted commands, the control program 32 may execute all the PJL commands included in the PJL file, whereas when at least one of the PJL commands included in the PJL file does not match the non-restricted command, the control program 32 may prohibit execution of each PJL command included in the PJL file. There may be cases in which the PJL file includes a plurality of groups of PJL commands and each group of PJL commands can be executed independently from the remaining groups of PJL commands. In such cases, after the control program 32 may execute each group of PJL commands that is consist of the non-restricted commands but may not execute each group of PJL commands that includes at least one PJL command not matching the non-restricted command.

In the above embodiment, when the printer 10 receives a PJL command by HTTPS, the printer 10 executes the process according to the PJL command, regardless of whether the PJL command is a restricted command. However, the printer 10 may execute processes according to PJL commands, regardless of whether the PJL commands are restricted, when the printer 10 receives the PJL commands according to a special protocol (an example of the first protocol). In this case, the special protocol may be a protocol that requires an authentication of the output device 50 before the output device 50 transmits a PJL file.

In the above embodiment, when the printer 10 receives a PJL command via the USB interface 31, the printer 10 executes the process according to the PJL command, regardless of whether the PJL command is a restricted command. However, the printer 10 may execute processes according to PJL commands, regardless of whether the PJL commands are restricted, when the printer 10 receives the PJL commands via a special communication interface (an example of the second interface) other than the USB interface 31. In this case, the special communication interface may be an interface that a user must be in proximity to the printer 10 in order to connect the client (the output device) to the printer 10. That is, the special communication interface may an interface that requires a user to be in proximity of the printer 10 so that the user can touch the printer 10.

While port numbers are limited to port 443 and port 9100 in the above embodiment, various port numbers may be employed.

The processes shown in FIGS. 2-5 are performed by the CPU 12. However, the processes shown in FIGS. 2-5 may be performed by a logic integrated circuit such as an application-specific integrated circuit (ASIC) or any combination of the CPUs and the logic integrated circuits.

What is claimed is:

1. A printing device comprising:
a first communication interface;
a second communication interface; and
a computer,
wherein the computer is configured to perform:
on a first condition including that a printer job language (PJL) command is received via the first communication interface that is a LAN interface,
prohibiting execution of the PJL command when the PJL command is classified into a first command type; and
executing the PJL command when the PJL command is classified into a second command type different from the first command type; and
on a second condition including that the PJL command is received via the second communication interface different from the LAN interface,
executing the PJL command regardless of whether the PJL command is classified into the first command type or the second command type.

2. The printing device according to claim 1, wherein the computer is configured to further perform:
on a third condition including that the PJL command is received via the first communication interface according to a first protocol,
executing the PJL command regardless of whether the PJL command is classified into the first command type or the second command type,
wherein the computer is configured to perform:
on the first condition that further includes a condition that the PJL command is received via the first communication interface according to a second protocol different from the first protocol,
prohibiting execution of the PJL command when the PJL command is classified into the first command type; and
executing the PJL command when the PJL command is classified into the second command type different from the first command type.

3. The printing device according to claim 2, wherein the first protocol is a protocol requiring a transmission device to send a password to a receiving device to authenticate the transmission device for permitting the transmission device to transmit data,
wherein the computer is configured to further perform:
on a condition that the computer receives a password from an output device, as the transmission device, via the first communication interface according to the first protocol,
authenticating the output device when the received password is acceptable; and
notifying the output device that the output device is permitted to send data,
wherein the computer is configured to perform:
on the third condition that further includes a condition that the PJL command is received via the first communication interface that is the LAN interface according to the first protocol after the notifying is completed,
executing the PJL command regardless of whether the PJL command is classified into the first command type or the second command type.

4. The printing device according to claim 2, wherein the computer is configured to further perform:
on a condition that the computer receives image data together with the PJL command via the first communication interface,
performing printing based on the image data according to the PJL command regardless of whether the computer receives the image data via the first communication interface according to the first protocol or the second protocol.

5. The printing device according to claim 1, wherein the computer is configured to further perform:
on a condition that the computer receives image data together with the PJL command,
performing printing based on the image data according to the PJL command regardless of whether the computer receives the image data via the first communication interface or the second communication interface.

6. The printing device according to claim 1, further comprising a memory,
wherein a setting value is stored in the memory and indicates whether a security mode is enabled or disabled, the computer being configured to perform an operation based on the setting value,
wherein the computer is configured to further perform:
on a third condition including that the PJL command is received via the first communication interface and the setting value indicates that the security mode is disabled,
executing the PJL command regardless of whether the PJL command is classified into the first command type or the second command type,
wherein the computer is configured to perform:
on the first condition that further includes a condition that the setting value indicates that the security mode is enabled,
prohibiting execution of the PJL command when the PJL command is classified into the first command type; and executing the PJL command when the PJL command is classified into the second command type different from the first command type.

7. The printing device according to claim 1, further comprising a memory,
wherein a setting value is stored in the memory, the computer being configured to perform an operation using the setting value,
wherein the first command type includes a value-change command type instructing to change the setting value,
wherein the computer is configured to further perform:
when executing the PJL command classified into the value-change command type,
a storing process to store a setting value according to the PJL command of the value-change command type in the memory,
wherein the second command type does not include the value-change command type,
wherein the computer is configured to further perform:
when executing the PJL command classified into the second command type,
a process different from the storing process.

8. The printing device according to claim 1, further comprising a memory,
wherein a setting value is stored in the memory, the computer being configured to perform an operation using the setting value,
wherein the first command type includes a PJL initialization command type instructing to initialize the setting value,
wherein the computer is configured to further perform:
when executing the PJL command classified into the PJL initialization command type,
an initialization process to initialize the setting value in the memory according to the PJL command of the PJL initialization command type,
wherein the second command type does not include the PJL initialization command type,
wherein the computer is configured to further perform:
when executing the PJL command classified into the second command type,
a process different from the initialization process.

9. The printing device according to claim 1, wherein the first command type includes a PJL offline command type instructing the printing device to be taken offline,
wherein the computer is configured to further perform:
when executing the PJL command classified into the PJL offline command type,
an offline process to take the printing device offline according to the PJL command of the PJL offline command type,
wherein the second command type does not include the PJL offline command type,
wherein the computer is configured to further perform:
when executing the PJL command classified into the second command type,
a process different from the offline process.

10. A printing device comprising:
a first communication interface; and
a computer,
wherein the computer is configured to perform:
on a first condition including that a printer job language (PJL) command is received via the first communication interface that is a LAN interface according to a first protocol,
executing the PJL command regardless of whether the PJL command is classified into a first command type or a second command type different from the first command type;
on a second condition including that the PJL command is received via the first communication interface that is the LAN interface according to a second protocol different from the first protocol,
prohibiting execution of the PJL command when the PJL command is classified into the first command type; and
executing the PJL command when the PJL command is classified into the second command type.

11. The printing device according to claim 10, wherein the first protocol is a protocol requiring a transmission device to send a password to a receiving device to authenticate the transmission device for permitting the transmission device to transmit data,
wherein the computer is configured to further perform:
on a condition that the computer receives a password from an output device, as the transmission device, via the first communication interface according to the first protocol,
authenticating the output device when the received password is acceptable; and
notifying the output device that the output device is permitted to send data,
wherein the computer is configured to perform:
on the first condition that further includes a condition that the PJL command is received via the first communication interface according to the first protocol after the notifying is completed,
executing the PJL command regardless of whether the PJL command is classified into the first command type or the second command type different from the first command type.

12. The printing device according to claim 10, further comprising:
a second communication interface configured to receive the PJL command, the second communication interface being different from the LAN interface
wherein the computer is configured to further perform:
on a condition that the computer receives image data together with the PJL command,
performing printing based on the image data according to the PJL command regardless of whether the computer receives the image data via the first communication interface or the second communication interface.

13. The printing device according to claim 10, wherein the computer is configured to further perform:
on a condition that the computer receives image data together with the PJL command via the first communication interface,
performing printing based on the image data according to the PJL command regardless of whether the computer receives image data via the first communication interface according to the first protocol or the second protocol.

14. The printing device according to claim 10, further comprising a memory,
wherein a setting value is stored in the memory and indicates whether a security mode is enabled or disabled, the computer being configured to perform an operation based on the setting value,
wherein the computer is configured to further perform:

on a third condition including that the PJL command is received via the first communication interface and the setting value indicates that the security mode is disabled,
    executing the PJL command regardless of whether the PJL command is classified into the first command type or the second command type,
wherein the computer is configured to perform,
    on the second condition that further includes a condition that the setting value indicates that the security mode is enabled,
        prohibiting execution of the PJL command when the PJL command is classified into the first command type; and
        executing the PJL command when the PJL command is classified into the second command type.

15. The printing device according to claim 10, further comprising a memory,
    wherein a setting value is stored in the memory, the computer being configured to perform an operation using the setting value,
    wherein the first command type includes a value-change command type instructing to change the setting value,
    wherein the computer is configured to further perform:
        when executing the PJL command classified into the value-change command type,
            a storing process to store a setting value according to the PJL command of the value-change command type in the memory,
    wherein the second command type does not include the value-change command type,
    wherein the computer is configured to further perform:
        when executing the PJL command classified into the second command type,
            a process different from the storing process.

16. The printing device according to claim 10, further comprising a memory,
    wherein a setting value is stored in the memory, the computer being configured to perform an operation using the setting value,
    wherein the first command type includes a PJL initialization command type instructing to initialize the setting value,
    wherein the computer is configured to further perform:
        when executing the PJL command classified into the PJL initialization command type,
            an initialization process to initialize the setting value in the memory according to the PJL command of the PJL initialization command type,
    wherein the second command type does not include the PJL initialization command type,
    wherein the computer is configured to further perform:
        when executing the PJL command classified into the second command type,
            a process different from the initialization process.

17. The printing device according to claim 10, wherein the first command type includes a PJL offline command type instructing the printing device to be taken offline,
    wherein the computer is configured to further perform:
        when executing the PJL command classified into the PJL offline command type,
            an offline process to take the printing device offline according to the PJL command of the PJL offline command type,
    wherein the second command type does not include the PJL offline command type,
    wherein the computer is configured to further perform:
        when executing the PJL command classified into the second command type,
            a process different from the offline process.

* * * * *